(12) United States Patent
Chappaz

(10) Patent No.: US 7,970,077 B2
(45) Date of Patent: Jun. 28, 2011

(54) ESTIMATION OF SYMBOLS OF TRANSMITTED SIGNALS USING HYPOTHESES

(75) Inventor: David F. Chappaz, Cambridgeshire (GB)

(73) Assignee: Cambridge Silicon Radio Limited, Cambridge (GB)

( * ) Notice: Subject to any disclaimer, the term of this patent is extended or adjusted under 35 U.S.C. 154(b) by 525 days.

(21) Appl. No.: 12/188,072

(22) Filed: Aug. 7, 2008

(65) Prior Publication Data

US 2010/0034251 A1  Feb. 11, 2010

(51) Int. Cl.
*H03K 9/00* (2006.01)
*H04L 27/00* (2006.01)

(52) U.S. Cl. ......... 375/316; 375/229; 375/324; 375/340
(58) Field of Classification Search .................. 375/229, 375/340, 324, 316
See application file for complete search history.

(56) References Cited

U.S. PATENT DOCUMENTS

| | | | | |
|---|---|---|---|---|
| 5,889,827 | A * | 3/1999 | Bottomley et al. | 375/350 |
| 6,333,953 | B1 * | 12/2001 | Bottomley et al. | 375/316 |
| 7,321,642 | B2 * | 1/2008 | Chen et al. | 375/341 |

* cited by examiner

*Primary Examiner* — Ted M Wang
(74) *Attorney, Agent, or Firm* — Fitzpatrick, Cella, Harper & Scinto

(57) ABSTRACT

A method of estimating a symbol that has been transmitted into a channel connecting a modulator for producing modulation symbols and an equaliser, wherein a channel estimate describes said channel and the method comprises: calculating a metric for each of a number of hypotheses of a sequence commencing with the symbol under estimation followed by a number of subsequently transmitted symbols, each symbol in the sequence occupying a respective node of the sequence; and deeming the symbol at the beginning of the hypothesis that has the best metric to be the symbol under estimation; wherein calculating a metric for a given hypothesis comprises: calculating a discrepancy metric at each node of the given hypothesis; and combining the discrepancy metrics of nodes in the given hypothesis to produce the metric; and wherein a discrepancy metric for a given node of a given hypothesis is an assessment of the difference between: a sample received from said channel at a time point corresponding to said given node; and a sample that would be received at that time point if said channel estimate were acting on a model signal comprising the symbols of the given hypothesis up to the given node preceded by any estimates of symbols transmitted into the channel immediately prior to said time point as may be required to fill the estimated channel. The invention also relates to corresponding apparatus.

11 Claims, 4 Drawing Sheets

ESTIMATION OF SYMBOLS OF TRANSMITTED SIGNALS USING HYPOTHESES

TECHNICAL FIELD

The invention relates to techniques for estimating symbols of a signal that has been sent to a receiver from a transmitter.

BACKGROUND

Many techniques exist for analysing a received communication purporting to represent a train of symbols and estimating what those symbols might be. For example, Viterbi equalisers and Decision Feedback Equalisers are technologies that have been employed to remove Inter Symbol Interference from the received signal (equalisation) and allow symbol estimation in the context of wireless telecommunications (e.g. in accordance with the 3GPP standards).

BRIEF SUMMARY

The invention is defined in the appended claims, to which reference should now be made.

BRIEF DESCRIPTION OF THE DRAWINGS

By way of example only, certain embodiments of the invention will now be described by reference to the accompanying drawings, in which.

DETAILED DESCRIPTION

Figure 1:
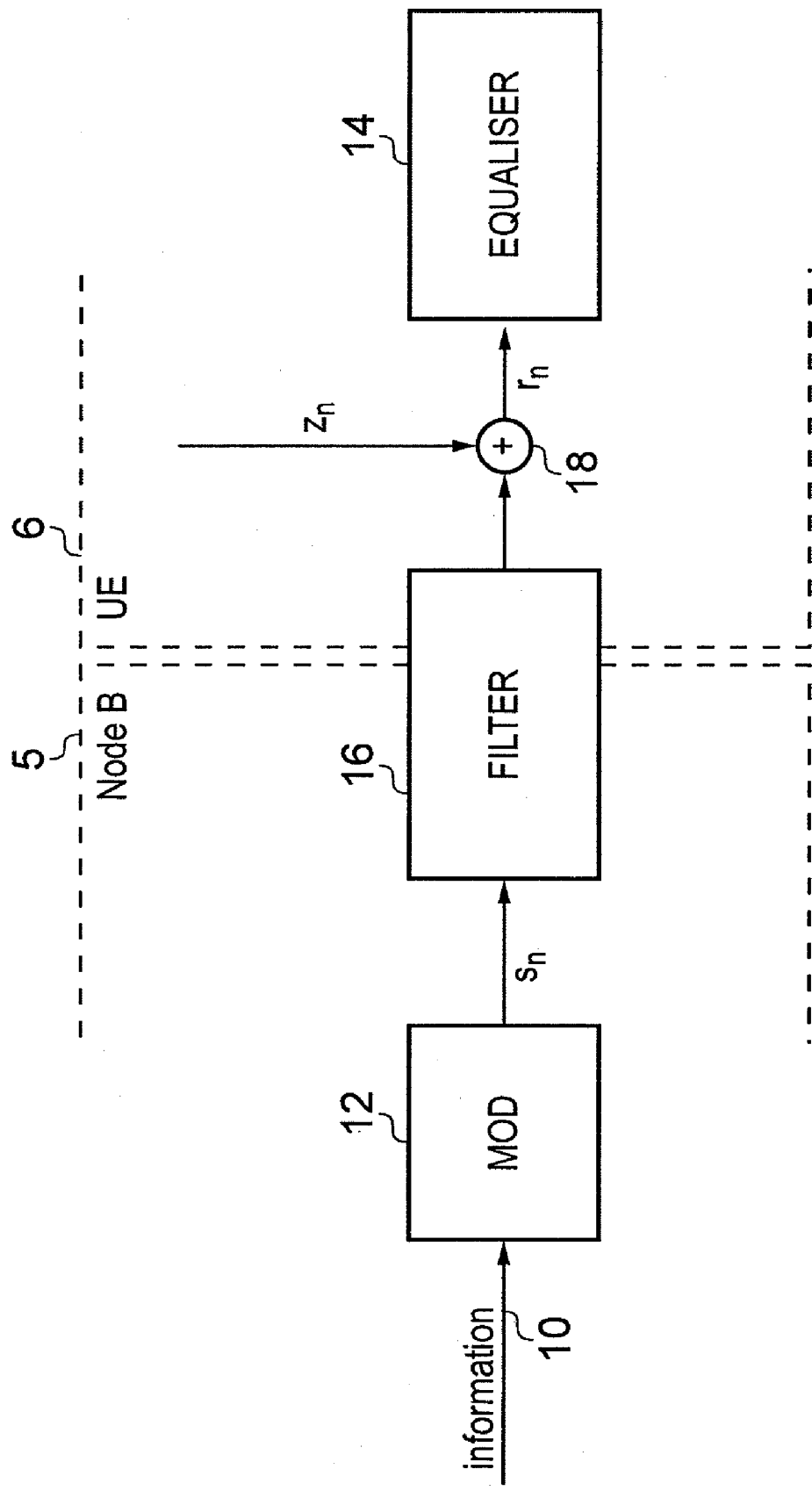
FIG. 1 illustrates a mathematical model of a transmitter communicating with a receiver.

FIG. 1 shows a mathematical model of a node B, 5, communicating with a UE 6, such as a cellular telephone. A stream of information bits 10 that is to be sent from the node B to the UE is applied to a modulator 12 within the node B. The modulator 12, in a known fashion, encodes the information bits 10 into a series of symbols selected from the constellation diagram of the modulation scheme that the modulator is using. In this example, the modulator uses the 8PSK modulation scheme illustrated in FIG. 2, which has a constellation of eight modulation symbols $\sigma_0$ to $\sigma_7$ spaced equally around a circle centred on the origin of the IQ plane.

According to the model shown in FIG. 1, the stream of symbols s produced by the modulator 12 reaches an equaliser 14 in the UE as a stream of received samples r via an FIR filter 16 having L taps. The signal r is affected by noise z, which is shown as being added to the output of the filter 16 at adder 18.

The filter 16 represents two filtering processes. The first of these filtering processes represents the physical radio channel between the node B and the UE and describes, inter alia, multipath propagation between the node B and the UE, transmission filtering performed in the node B and reception filtering performed in the UE. The second filtering process that in this example is taken into account by filter 16 is a feed forward filtering process that occurs in the UE at a point upstream from the equaliser 14. In brief, the purpose of this feed forward filtering operation is to condition the impulse response estimate of the aforementioned physical radio channel to improve the performance of the equaliser. Examples of such feed-forward filters can be Whitened Matched Filters (WMF) to make the channel minimum phase, or usual feed-forward filters designed for MMSE-DFE or ZF-DFE equalisers.

The signals in the model of FIG. 1 are digital and comprise streams of samples. For simplicity, it is assumed that the sampling rate of the signals in FIG. 1 is equal to the rate of production of symbols by the modulator 12. That is to say, it is assumed that the signals in FIG. 1 are sampled at the symbol rate.

FIG. 1 shows the position when the modulator 12 is emitting the $n^{th}$ symbol $s_n$ of signal s. Accordingly, the other signals within FIG. 1 bear the same subscript n denoting the current time point, n. Mathematically speaking then, the output of the propagation channel model at time n is:

$$\tilde{r}_n = \sum_{i=0}^{\lambda-1} s_{n-i} \cdot f_i \qquad (1)$$

where the $f_i$ values are the tap coefficients of the FIR filter representing multipath propagation and $\lambda$ is the length of filter (hence with memory $\lambda-1$).

The specifications of the feed forward filter that FIR filter 16 in part describes are known to the UE 6 since the feed forward filter forms part of, and is configured by, the UE. Also, the UE is able to make estimates of the impulse response of the physical radio channel into which the signal s is transmitted. Many known schemes exist for estimating a channel impulse response, as will be apparent to the skilled person. Using the specification of the feed forward filter and an estimate of the impulse response of the physical radio channel, the UE is able to calculate, in a known manner, a set of tap coefficients $g_i$ (where i=0 to L−1) for an FIR filter representing filter 16 where L is the length of filter (hence with memory L−1). Mathematically speaking then, the input to the equaliser 14 at time n is:

$$r_n = z_n + \sum_{i=0}^{L-1} s_{n-i} \cdot g_i$$

Figure 3:
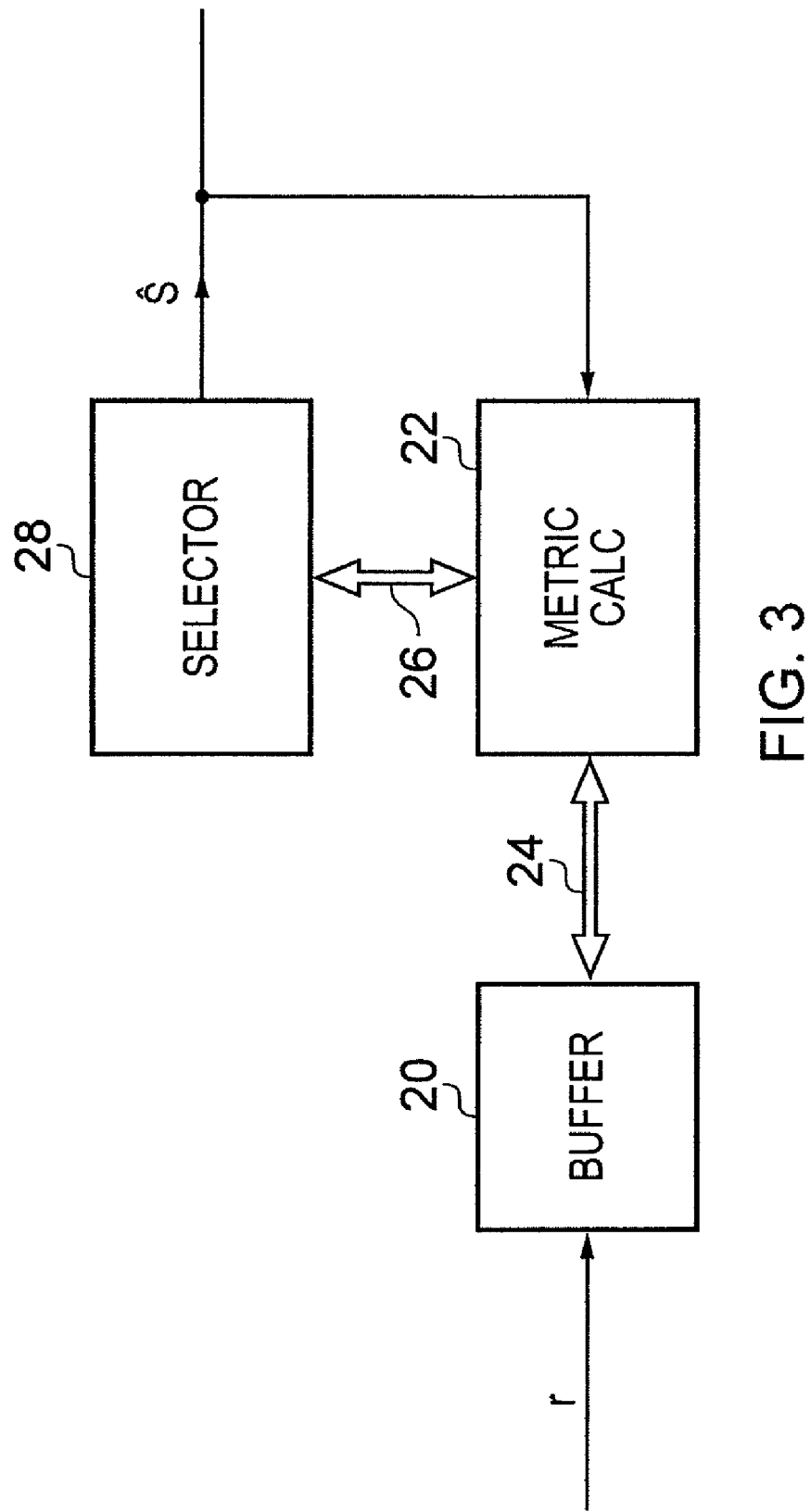
FIG. 3 illustrates schematically certain elements within the equaliser shown in FIG. 1.

FIG. 3 shows the equaliser 14 in more detail. The signal r is stored into a buffer 20 for use in producing an estimate ŝ of symbol stream s. A metric calculation unit 22 communicates with the buffer 20 via a bus 24 to enable the metric calculation unit 22 to retrieve such samples of signal r as it from time to time requires in the performance of its calculations (which will be described later). The metric calculation unit 22 is also connected to a selector unit 28 by another bus 26, for the purpose of supplying the selector unit 28 with sets of graded hypotheses (whose nature will be explained shortly). The selector unit 28 uses the sets of graded hypotheses to generate the signal ŝ which exits the equaliser 14 for supply, ultimately, to an information sink but which is also fed back to the metric calculation unit 22. The information sink (not shown) could be, for example, an audio codec for driving a loudspeaker in the UE.

The equaliser 14 estimates the symbols of signal s sequentially, in order of increasing n. The process for generating $\hat{s}_n$, the $n^{th}$ symbol of signal ŝ, will now be described.

There are $P^b$ possibilities for the content of a vector $\vec{v}_n$ of b consecutive hypothesised symbols of s commencing with $\tilde{s}_n$, where P is the number of symbols in the constellation of the modulation scheme that is being used. In the present example, 8PSK is being used, so there are $8^b$ possibilities for vector $\vec{v}_n$. These possibilities for $\vec{v}_n$, which are often called hypotheses, can be illustrated by means of a tree structure, as illustrated in FIG. 4.

Figure 4:
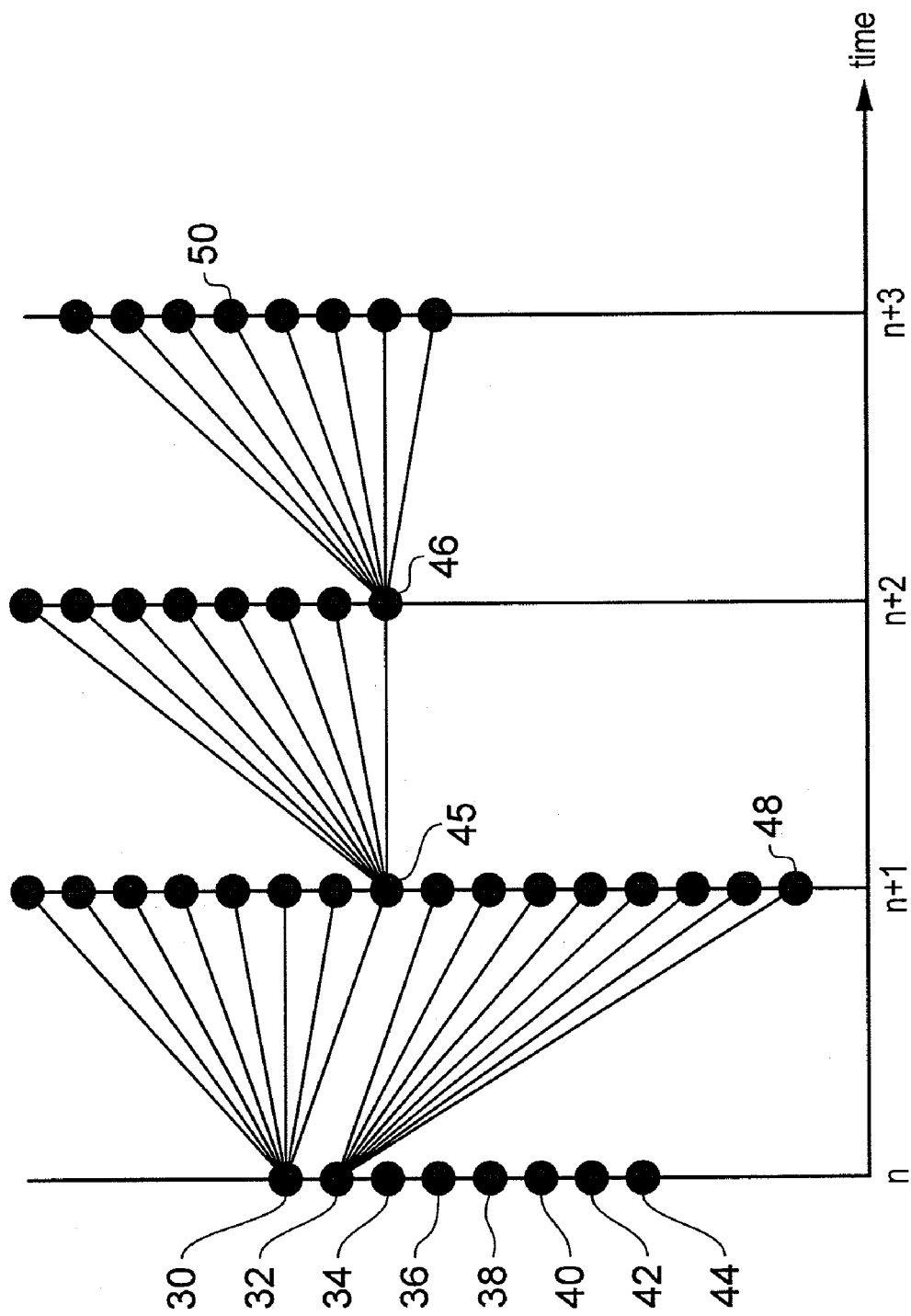
FIG. 4 is a tree diagram illustrating possible hypotheses for a test vector employed by the equaliser of FIG. 3.

In FIG. 4, the horizontal dimension represents time, which is measured in symbol periods. FIG. 4 is a partial illustration of the case where b=4. There are 8 possibilities for symbol $\tilde{s}_n$, and these are represented by a column of nodes 30 to 44 at time n. From each of the nodes 30 to 44, there are eight possibilities for $\tilde{s}_{n+1}$ at time n+1. However, to keep FIG. 4 intelligible, only the nodes for the eight possibilities for $\tilde{s}_{n+1}$ that lead out of node 30 and the nodes for the eight possibilities for $\tilde{s}_{n+1}$ that lead out of node 32 have been shown at time n+1. For similar reasons, only the nodes for the eight possibilities for $\tilde{s}_{n+2}$ at time n+2 that lead out of node 45 at time n+1 and the nodes for the eight possibilities for $\tilde{s}_{n+3}$ at time n+3 that lead out of node 46 at time n+2 are shown. At each time point in FIG. 4, the nodes fall into one or more octets, the nodes in each octet sharing a common origin in the preceding time point. In each of these octets, the nodes relate, from top to bottom, to modulation symbols $\sigma_0$ to $\sigma_7$ respectively. For example, node 38 relates to the possibility that $\tilde{s}_n$ is $\sigma_4$ and nodes 45 and 48 both relate to the possibility that $\tilde{s}_{n+1}$ is $\sigma_7$, albeit that they stem from different possibilities for $\tilde{s}_n$.

As stated earlier, the tree shown in FIG. 4 illustrates the various hypotheses for vector $\vec{v}_n$. For example, the path connecting the series of nodes 30, 45, 46 and 50 represents the hypothesis [$\sigma_0$, $\sigma_7$, $\sigma_7$, $\sigma_3$]. The metric calculation unit can calculate a total error metric (TEM) for each hypothesis of $\vec{v}_n$. The process of calculating an exemplary one of these TEMs will now be described.

Assume the case where b=4 and that the 8PSK constellation symbols hypothesised for $s_n$, $s_{n+1}$, $s_{n+2}$ and $s_{n+3}$ are $\tilde{s}_n$, $\tilde{s}_{n+1}$, $\tilde{s}_{n+2}$ and $\tilde{s}_{n+3}$ respectively, such that the hypothesis of $\vec{v}_n$ under examination is [$\tilde{s}_n$, $\tilde{s}_{n+1}$, $\tilde{s}_{n+2}$, $\tilde{s}_{n+3}$,]. For each element $\tilde{s}_{n+a}$ (where a=0 to b-1) of the hypothesis, i.e. for each node of the hypothesis, a discrepancy metric $c(\tilde{s}_{n+a})$ is calculated as:

$$c(\tilde{s}_{n+a}) = \left| r_{n+a} - \sum_{i=0}^{Max(a,L-1)} g_i \cdot \tilde{s}_{n+a-i} - \sum_{i=a+1}^{L-1} g_i \cdot \hat{s}_{n+a-i} \right|^2$$

More specifically:

if $a = 0$, $$c(\tilde{s}_n) = \left| r_n - g_0 \cdot \tilde{s}_n - \sum_{i=1}^{L-1} g_i \cdot \hat{s}_{n-i} \right|^2 \quad (2)$$

if $0 < a < L-1$, $$c(\tilde{s}_{n+a}) = \left| r_{n+a} - \sum_{i=0}^{a} g_i \cdot \tilde{s}_{n+a-i} - \sum_{i=a+1}^{L-1} g_i \cdot \hat{s}_{n+a-i} \right|^2 \quad (3)$$

if $a = L-1$ or $a > L-1$, $$c(\tilde{s}_{n+a}) = \left| r_{n+a} - \sum_{i=0}^{L-1} g_i \cdot \tilde{s}_{n+a-i} \right|^2 \quad (4)$$

Notice however that in the case where a>L−1, the discrepancy metric $c(\tilde{s}_{n+a})$ doesn't depend on $\tilde{s}_n$ (e.g. where a=L, the "earliest" hypothesis taken into account in the sum is $\tilde{s}_{n+1}$ for i=L−1). As a matter of fact, each transmitted symbol has an influence on the received signal limited to a time range equal to the duration of the channel impulse response. In other words $s_n$ has no influence on received samples $r_{n+L}$ and beyond, therefore quite naturally, the discrepancy metrics $c(\tilde{s}_{n+L})$ and beyond do not depend on the hypothesis $\tilde{s}_n$ made for $s_n$.

Thus, $c(\tilde{s}_{n+a})$ is, in general terms, the squared Euclidean distance between a sample $r_{n+a}$ and the result of loading into an FIR filter having the $g_i$ tap coefficients a model signal comprising hypothesised symbol $\tilde{s}_{n+a}$ preceded by any other hypothesised symbols back to $\tilde{s}_n$, preceded by as many of the estimated symbols from $\hat{s}_{n-1}$ backwards as are necessary to give the model signal a length of L symbols. For example, for a=2 and L=4, the model signal would take the form [$\tilde{s}_{n+2}$, $\tilde{s}_{n+1}$, $\tilde{s}_n$, $\hat{s}_{n-1}$].

The TEM y for the hypothesis $\vec{v}_n$ (with b elements $\tilde{s}_n$, $\tilde{s}_{n+1}$, ..., $\tilde{s}_{n+b-1}$) is then given by:

$$y(\vec{v}_n) = \sum_{a=0}^{b-1} c(\tilde{s}_{n+a}) \quad (5)$$

In general terms, however, it would usually be prohibitively computationally intensive to calculate a TEM for each and every hypothesis of $\vec{v}_n$. Therefore, the metric calculation unit 22 prunes the number of branches in the tree diagram representing the hypotheses for $\vec{v}_n$. An example of a pruning strategy will now be described with reference to FIGS. 2 and 4.

Figure 2:
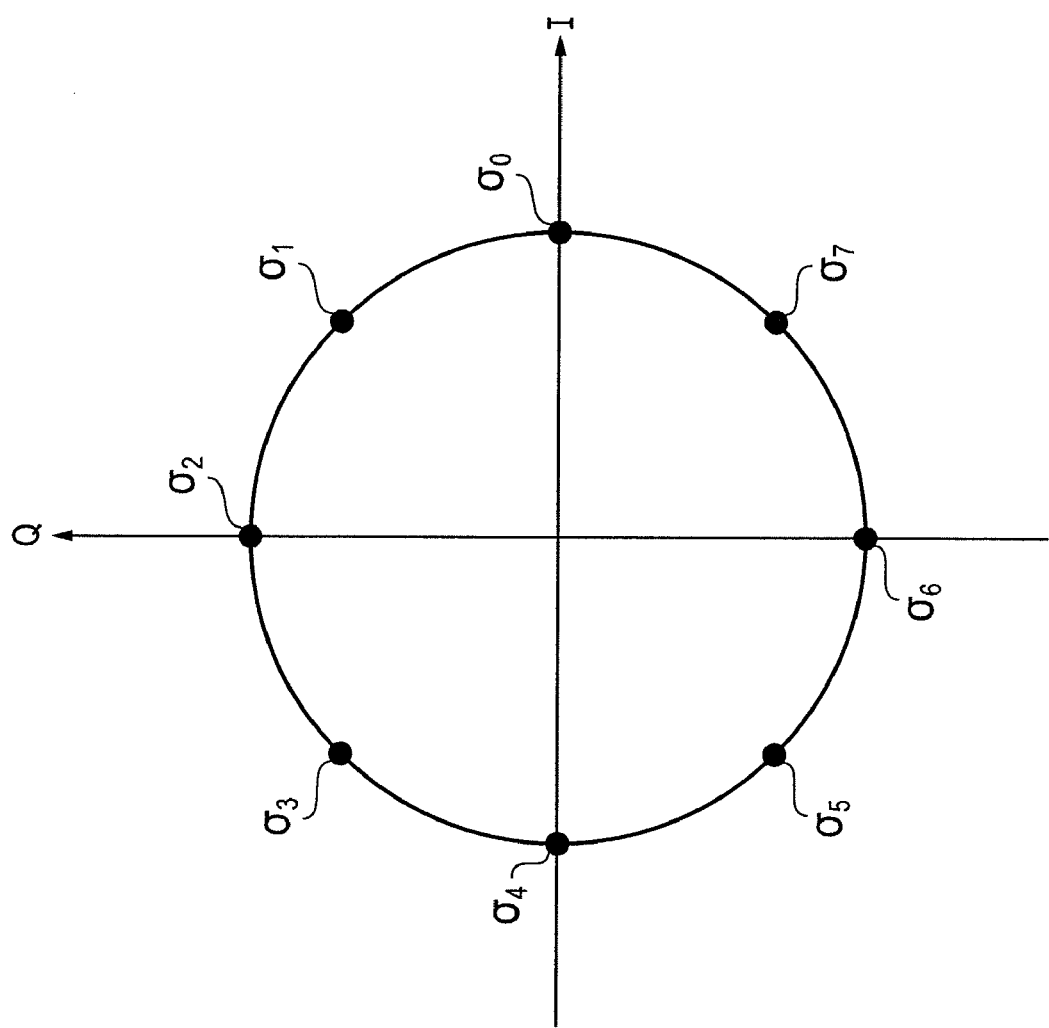
FIG. 2 illustrates the symbol constellation of the 8PSK modulation scheme.

In FIG. 4, each hypothesis is a separate path through the entire tree, beginning at time n and ending at time n+3 (it will be recalled that the diagram relates to the case where b=4). In general terms, the exemplary pruning strategy operates by keeping just three of the nodes in each octet. Within any given octet, the retained nodes are the node which relates to the symbol with the lowest discrepancy metric and the nodes that relate to the modulation symbols that circumferentially neighbour the modulation symbol of the node having the lowest discrepancy metric. That is to say, if in a particular octet the node with the lowest discrepancy metric relates to the hypothesis that $\tilde{s}_{n+a}$ is $\sigma_j$, (where j is one of 0 to 7 because the 8PSK constellation of FIG. 2 is assumed), then the two other retained nodes of the octet are those for $\tilde{s}_{n+a}=\sigma_{j+1}$ and $\tilde{s}_{n+a}=\sigma_{j-1}$ (where j increments and decrements cyclically).

Only hypotheses of $\vec{v}_n$ passing through retained nodes then have their TEM evaluated, and the pruning process commences with the octet for time n. For example, assume that the lowest discrepancy metric in the a=0 octet (i.e. the octet for time n) belongs to node 30 for $\sigma_0$. Then, only hypotheses that pass through that node and nodes 32 and 44 for neighbouring modulation symbols $\sigma_1$ and $\sigma_7$ are retained. Each of these three retained nodes then gives rise to a respective octet for a=1. In each of the three octets for a=1, only three nodes are retained using the above rule. And so the pruning process continues, until the nodes for a=3 have been pruned. The TEMs for the surviving hypotheses of $\vec{v}_n$ can be built up from the discrepancy metrics as the pruning process steps through the tree from a=0 to 3.

The metric calculation unit 22 provides the TEMs and their associated hypotheses of $\vec{v}_n$ to the selector unit 28. The selector unit 28 identifies the hypothesis with the smallest TEM and issues $\hat{s}_n$ of that hypothesis as $\hat{s}_n$. Thus, a decision is made using information from times n, n+1, . . . n+b, but the decision is only a decision on the symbol at time n. The value $\hat{s}_n$ is also fed back to the metric calculation unit 22 to participate in the calculation of the next iteration of the discrepancy metrics, i.e. for the determination of $\hat{s}_{n+1}$.

It will be apparent to the skilled person that various modifications to the described embodiments can be envisaged without departing from the scope of the invention.

For example, where sufficient data processing resources are available to the UE, the UE could indeed calculate TEMs for all possible hypotheses and not resort to pruning. In other variants, pruning could be used, but in an alternative form to that described above, e.g. different pruning strategies can be used at different levels in the tree.

Within the UE 6, the various units involved in the invention, i.e. the buffer 20, the metric calculator 22 and the selector 28 are all implemented as parts of an application specific integrated circuit (ASIC), as indeed are other elements of the UE. In other embodiments, however, some of these units can be replaced by functions performed by a processor with assistance of suitable memory.

Other modifications will be apparent to readers skilled in the field of digital communications, and it is to be understood that the scope invention is to be determined by the wording of the appended claims when interpreted in the light of the foregoing description.

The invention claimed is:

1. A method of estimating a symbol that has been transmitted into a channel connecting a modulator for producing modulation symbols and an equaliser, wherein a channel estimate describes said channel and the method comprises:
   a. calculating a metric for each of a number of hypotheses of a sequence commencing with the symbol under estimation followed by a number of subsequently transmitted symbols, each symbol in the sequence occupying a respective node of the sequence; and
   b. deeming the symbol at the beginning of the hypothesis that has the best metric to be the symbol under estimation;

wherein calculating a metric for a given hypothesis comprises:
   c. calculating a discrepancy metric at each node of the given hypothesis; and
   d. combining the discrepancy metrics of nodes in the given hypothesis to produce the metric;

and wherein a discrepancy metric for a given node of a given hypothesis is an assessment of the difference between:
   e. a sample received from said channel at a time point corresponding to said given node;
   f. and a sample that would be received at that time point if said channel estimate were acting on a model signal comprising the symbols of the given hypothesis up to the given node preceded by any estimates of symbols transmitted into the channel immediately prior to said time point as may be required to fill the estimated channel.

2. A method according to claim 1, wherein the channel comprehends a physical channel between a transmitter containing the modulator and a receiver containing the equaliser and a filtering process for conditioning multipath delays embodied by the physical channel.

3. A method according to claim 2, wherein the filtering process is a feed forward filtering process acting on samples received from the physical channel.

4. A method according to claim 1, wherein the number of hypotheses is determined by a pruning process.

5. A method according to claim 4, wherein the pruning process comprises eliminating those possible hypotheses whose discrepancy metrics at a particular node are the worst.

6. A data carrier containing a program which when run on a data processor will cause the data processor to perform the method of claim 1.

7. Apparatus for estimating a symbol that has been transmitted into a channel connecting a modulator for producing modulation symbols and an equaliser, wherein a channel estimate describes said channel and the apparatus comprises:
   a) a calculator arranged to calculate a metric for each of a number of hypotheses of a sequence commencing with the symbol under estimation followed by a number of subsequently transmitted symbols, each symbol in the sequence occupying a respective node of the sequence; and
   b) a selector arranged to deem the symbol at the beginning of the hypothesis that has the best metric to be the symbol under estimation;

wherein said calculator is arranged to:
   c) calculate a discrepancy metric at each node of the given hypothesis; and
   d) combine the discrepancy metrics of nodes in the given hypothesis to produce the metric;

and wherein said calculator is arranged to produce a discrepancy metric for a given node of a given hypothesis in the form of an assessment of the difference between:
   e) a sample received from said channel at a time point corresponding to said given node; and
   f) a sample that would be received at that time point if said channel estimate were acting on a model signal comprising the symbols of the given hypothesis up to the given node preceded by any estimates of symbols transmitted into the channel immediately prior to said time point as may be required to fill the estimated channel.

8. Apparatus according to claim 7, wherein the channel comprehends a physical channel between a transmitter containing the modulator and a receiver containing the equaliser and a filtering process for conditioning multipath delays embodied by the physical channel.

9. Apparatus according to claim 7, wherein the filtering process is a feed forward filtering process acting on samples received from the physical channel.

10. Apparatus according to claim 7, wherein said calculator is arranged to determine said number of hypotheses through pruning a set of possibilities for the hypotheses.

11. Apparatus according to claim 10, wherein said calculator is arranged to prune said set through eliminating those possible hypotheses whose discrepancy metrics at a particular node are the worst.

* * * * *